United States Patent [19]
Morita

[11] Patent Number: 5,493,363
[45] Date of Patent: Feb. 20, 1996

[54] IMAGE RECORDING APPARATUS AND VARIABLE DIAMETER CONVEYING ROLLERS WITH V-SHAPED PRESSURE PIECE AT EXPOSURE STATION

[75] Inventor: Naoyuki Morita, Kanagawa, Japan

[73] Assignee: Fuji Photo Film Co., Ltd., Kanagawa, Japan

[21] Appl. No.: 118,236

[22] Filed: Sep. 9, 1993

[30] Foreign Application Priority Data

Sep. 10, 1992 [JP] Japan .................................. 4-242053

[51] Int. Cl.$^6$ ................................ G03B 27/30
[52] U.S. Cl. ............................. 355/99; 355/100
[58] Field of Search ................ 355/27, 28, 32, 355/99, 100, 103; 346/76 R

[56] References Cited

U.S. PATENT DOCUMENTS

| | | | |
|---|---|---|---|
| 4,189,231 | 2/1980 | Haus | 355/100 |
| 4,566,787 | 1/1986 | Lüllau | 355/100 |
| 4,864,352 | 9/1989 | Morita | 355/27 |
| 4,894,666 | 1/1990 | Ishikawa et al. | 355/27 X |
| 4,924,256 | 5/1990 | Yanatori | 355/28 |
| 4,942,422 | 7/1990 | Mashiko et al. | 355/28 |
| 5,073,792 | 12/1991 | Paccagnella | 355/103 X |
| 5,087,938 | 2/1992 | Nagumo et al. | 355/27 |
| 5,122,433 | 6/1992 | Kawaguchi | 355/27 X |
| 5,315,347 | 5/1994 | Shimizu et al. | 355/27 X |

*Primary Examiner*—Robert Beatty
*Attorney, Agent, or Firm*—Sughrue, Mion, Zinn, Macpeak & Seas; Richard C. Turner

[57] ABSTRACT

An image recording apparatus is disclosed, which includes an exposure portion, a first conveying roller pair, a second conveying roller pair, a V-shaped pressuring piece disposed between the first and second conveying roller pairs, the pressuring piece extending along the lateral direction of the first image recording material and being in contact with a non-exposure surface of the first image recording material, an image-forming-solvent applying portion for applying an image forming solvent onto the first image recording material, and a heating drum for superimposing the first image recording material and a second image recording material together so as to heat develop and transfer an image of the first image recording material to the second image recording material. Thus, since the first image recording material is raised by the pressuring piece, even if the first image recording material is a thin photosensitive material, it can be stably exposed and conveyed. In addition, the first and second driving roller pairs have different diameters so as to keep the first image recording material in tension.

15 Claims, 8 Drawing Sheets

IMAGE RECORDING APPARATUS AND VARIABLE DIAMETER CONVEYING ROLLERS WITH V-SHAPED PRESSURE PIECE AT EXPOSURE STATION

BACKGROUND OF THE INVENTION

1. Field of the Invention

The present invention relates to an image recording apparatus for performing an image recording processing utilizing two types of image recording materials and the method of the same.

2. Description of the Related Art

Image recording apparatuses which performing image recording processing utilizing two types of image recording materials (such as photosensitive material and image receiving material) are known.

In an image recording apparatus of this type, photosensitive material and an image receiving material are accommodated in rolled form in respective light-insulated magazines. Whenever an image recording process is performed, these materials are sequentially extracted. In addition, the image recording apparatus includes an image-forming-solvent applying portion which applies an image forming solvent onto the photosensitive material. Moreover, the apparatus has a heat development and transfer portion which comprises a heating drum and an endless resilient belt. The endless resilient belt is in pressing contact with the outer periphery of the heating drum and thereby rotating the belt along therewith.

While the photosensitive material which has been extracted from its magazine and then cut by a predetermined length is being nipped and conveyed by conveying rollers, an image is exposed thereon. In the image-forming-solvent applying portion, water serving as an image forming solvent is applied to the photosensitive material. Thereafter, the photosensitive material is conveyed to the heat development and transfer portion. As with the photosensitive material, the image receiving material is extracted from its magazine and cut by a predetermined length. Thereafter, the image receiving material is conveyed to the heat development and transfer portion by conveying rollers in synchronization with the photosensitive material. In the heat development and transfer portion, the photosensitive material onto which water has been applied and the photosensitive material are superimposed onto each other and in this state wound around the outer periphery of the heating drum. While these materials are nipped and conveyed between the heating drum and the endless resilient belt, the photosensitive material is heat developed and an image is transferred to the image receiving material. Thus, the image is formed (recorded) onto the image receiving material.

However, in such an image recording apparatus, the image recording process must be repeatedly performed several times. In this case, a large amount of photosensitive material must be accommodated in the magazine. The photosensitive material must be successively extracted from the magazine. Thereafter, the photosensitive material must be exposed and heat-developed. As a result, a particular image is formed (recorded) on the image receiving material.

However, it is difficult for the magazine to accommodate a large amount of photosensitive material because of the limited space of the magazine. In addition, if the size of the magazine increased, its weight and thereby the size of the overall apparatus would increase. It would therefore be difficult to install such a large apparatus in a place with limited space.

To solve such a problem, the thickness of the photosensitive material could be decreased. In this case, however, the flatness of the photosensitive material would diminish, thereby causing the material to skew. As a result, when the photosensitive material is exposed, the amount of exposing light would fluctuate, thereby causing the density of the resultant image to adversely varying, causing deterioration in image quality. When the base of the photosensitive material is a paper, it is likely skewed. In particular, when the entire thickness of the a paper base (in the case where both the surfaces of the paper are laminated with a polymer, the thickness of the polymer is included) is 200 µm or less or when both longitudinal and lateral hardnesses of the paper base (namely, paper hardnesses) are 20 grams/cm or less, the paper is more likely to skew. When a photosensitive material with a paper base whose thickness is 150 µm or less or whose hardness is 10 grams/cm or less, it is most likely to skew. Thus, the density of the resultant image varies adversely.

Therefore, an object of the present invention is to provide an image recording apparatus for stably exposing and conveying a photosensitive material with a thickness of 200 µm or less or a photosensitive material containing a paper base with a hardness of 20 g/cm or less and the method of the same so as to improve image quality.

SUMMARY OF THE INVENTION

A first aspect of the present invention is to provide an image recording apparatus, comprising an exposure portion for exposing an image on a first image recording material so as to form an image thereon, a first conveying roller pair disposed on an upstream side of the exposure portion and adapted for nipping and conveying the first image recording material, a second conveying roller pair disposed on a downstream side of the exposure portion and adapted for nipping and conveying the first image recording material, a pressuring piece disposed between the first and second conveying roller pairs, the pressuring piece extending along the lateral direction of the first image recording material and being in contact with a non-exposure surface thereof, an image-forming-solvent applying portion disposed on a downstream side of the second conveying roller pair and adapted for conveying and applying an image forming solvent onto the first image recording material, and a heating drum for superimposing the first image recording material and a second image recording material together, for winding the first and second image recording materials therearound, and for heating the first and second image recording materials so as to heat develop and transfer an image of the first image recording material to the second image recording material.

In the first aspect of the present invention, the first and second conveying roller pairs each have a drive roller and a follower roller, the drive roller being made of Teflon coated stainless steel and rotated, the follower roller being made of rubber and in contact with the drive roller.

The pressuring piece preferably is V-shaped and is made of Teflon coated stainless steel, the distal end thereof being in contact with the first image recording material so as to raise the material.

According to the apparatus of the present invention, the first image recording material is raised by the pressuring piece disposed between the first and second conveying rollers, each of which are constructed as the drive roller and the follower roller. Thus, even if the first image recording material is a thin photosensitive material, it can be stably exposed and conveyed, thereby improving image quality.

A second aspect of the present invention is an image recording apparatus, comprising an exposure portion for exposing an image onto a first image recording material so as to form an image thereon, a first conveying roller pair disposed on an upstream side of the exposure portion and adapted for nipping and conveying the first image recording material, a second conveying roller pair disposed on a downstream side of the exposure portion and adapted for nipping and conveying the first image recording material and for tensioning the first image recording material along with the first conveying roller pair, the peripheral speed of the second conveying roller pair being higher than the peripheral speed of the first conveying roller pair, a pressuring piece disposed between the first and second conveying roller pairs, the pressuring piece extending along the lateral direction of the first image recording material and being in contact with a non-exposure surface thereof, an image-forming-solvent applying portion for conveying and applying an image forming solvent to the first image recording material, a heating drum having an endless resilient belt wound therearound, the endless resilient belt being adapted for superimposing the first image recording material and a second image recording material together and for winding the first and second image recording materials around the heating drum, the heating drum being adapted for heating the first and second image recording materials so as to heat develop and transfer an image of the first image recording material to the second image recording material, and a pair of peeling-off blades disposed opposite to the heating drum and engaged with the first and second image recording mediums, the peeling-off blades being adapted for peeling off the first and second image recording mediums from the heating drum.

In the second aspect of the present invention, a first reel is mounted onto an axial end of the first conveying roller pair, a second reel being mounted onto an axial end of the second conveying roller pair, a belt being put around the first and second reels so as to transmit a drive force therebetween.

The first and second conveying roller pairs each preferably have a drive roller and a follower roller, the drive roller being rotated, the follower roller being in contact with the drive roller, the outer diameter of the drive roller of the first conveying roller pair being smaller than the outer diameter of the drive roller of the second conveying roller pair, so as to cause tension in the first image recording material due to the difference of peripheral speeds of the first and second conveying roller pairs.

According to the apparatus of the present invention, even if the drive rollers of the first and second conveying rollers are rotated at the same speed, the first image recording material is tensioned by the difference of the peripheral speeds of the drive rollers. In addition, the first image recording material is raised by the pressuring piece. Thus, even if the first image recording material is a thin photosensitive material, it can be stably exposed and conveyed, thereby improving image quality.

A third aspect of the present invention is an image recording method, comprising the steps of exposing an image on an exposure surface of a first image recording material while the first image recording material is being pressured by a pressuring piece which comes in contact with a non-exposure surface of the first image recording material which is being conveyed, applying an image forming solvent for forming an image on the first image recording material by an image-forming-solvent applying portion, winding the first image recording material and a second image recording material which are affixed around a heating drum so as to heat develop and transfer an image formed on the first image recording material to the second image recording material, and separating the first image recording material from the second image recording material and peeling them off from the heating drum.

In the third aspect of the present invention, the exposing step is preferably performed by exposing an image on the first image recording material while the non-exposure surface of the first image recording material is being pressured by the pressuring piece which extends along the lateral direction of the first image recording material.

According to the method of the present invention, since the first image recording material is conveyed along the pressuring piece which extends along the lateral direction of the first image recording material and comes in contact with the non-exposure surface of the first image recording material, the image recording material is stably exposed, thereby improving image quality.

According to the image recording apparatus and the method of the same, while the first image recording material is being conveyed, it is exposed. Thereafter, an image forming solvent is applied to the first image recording material in the image-forming-solvent applying portion. Then, both the first and second image recording materials are affixed and wound around the heating drum. Thereafter, an image is formed (recorded) onto the second image recording material by the heat development and transfer process. Since the pressuring piece which extends along the lateral direction of the first image recording material and comes in contact with the first image recording material disposed between the first and second conveying rollers, the first image recording material is raised from the normal conveying path while it is exposed.

Thus, even if the distance between the conveying rollers is long, since the first image recording material is guided by the pressuring piece, it is stably conveyed at the exposure position. Thus, the first image recording material is least skewed. As a result, image quality of the second image recording material where an image is heat developed and transferred from the first image recording material is remarkably improved.

As described above, according to the image recording apparatus and the image recording method of the present invention, the apparatus can be simply and inexpensively constructed. In addition, even if the photosensitive material is thin, it can be stably exposed and conveyed. Moreover, the quality of an image formed on the image recording material by the heat development and transfer process is remarkably improved.

These and other objects, features and advantages of the present invention will become more apparent in light of the following detailed description of a best mode embodiment thereof, as illustrated in the accompanying drawings.

BRIEF DESCRIPTION OF DRAWINGS

FIGS. 4A and 4B are enlarged sectional view showing peripheral portions of an exposure portion of FIG. 1, where

DETAIL DESCRIPTION OF THE PREFERRED EMBODIMENT

Figure 1:
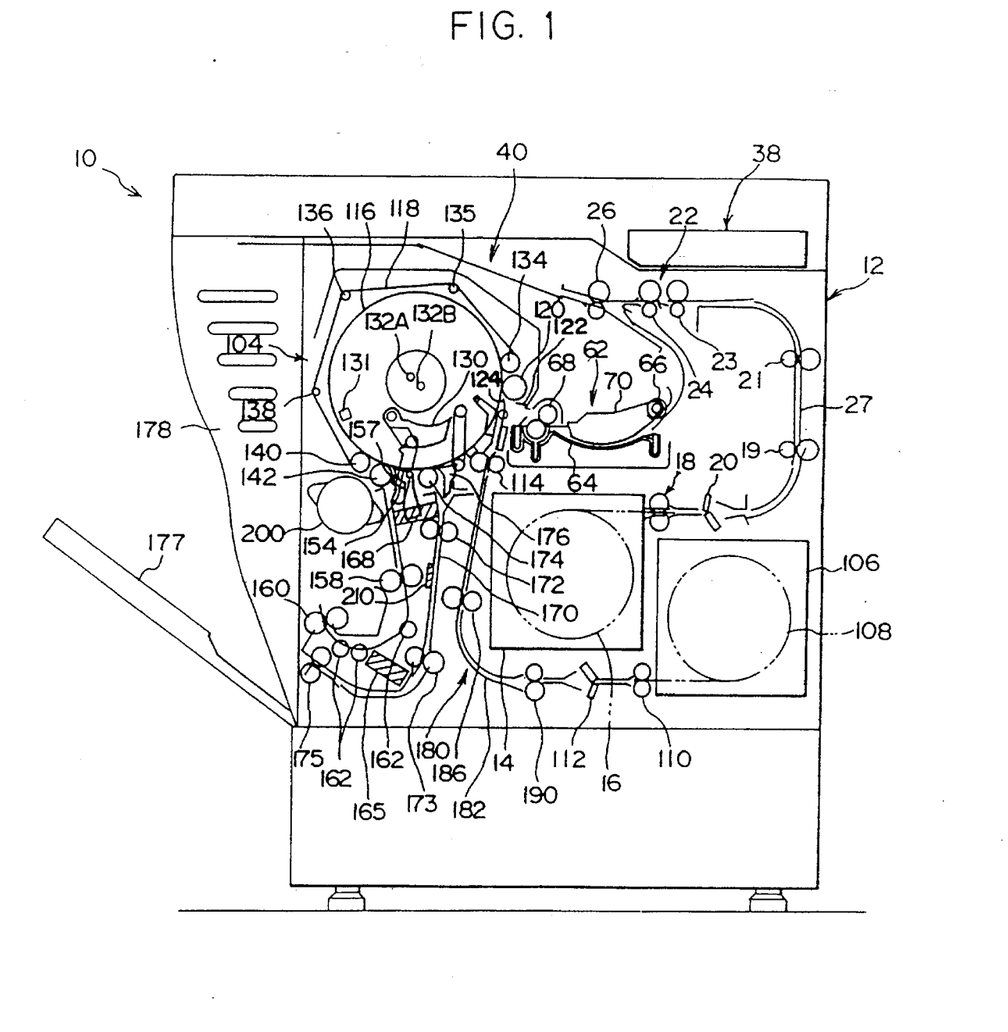
FIG. 1 is a sectional view schematically showing the overall construction of an image recording apparatus according to an embodiment of the present invention.
Figure 2:
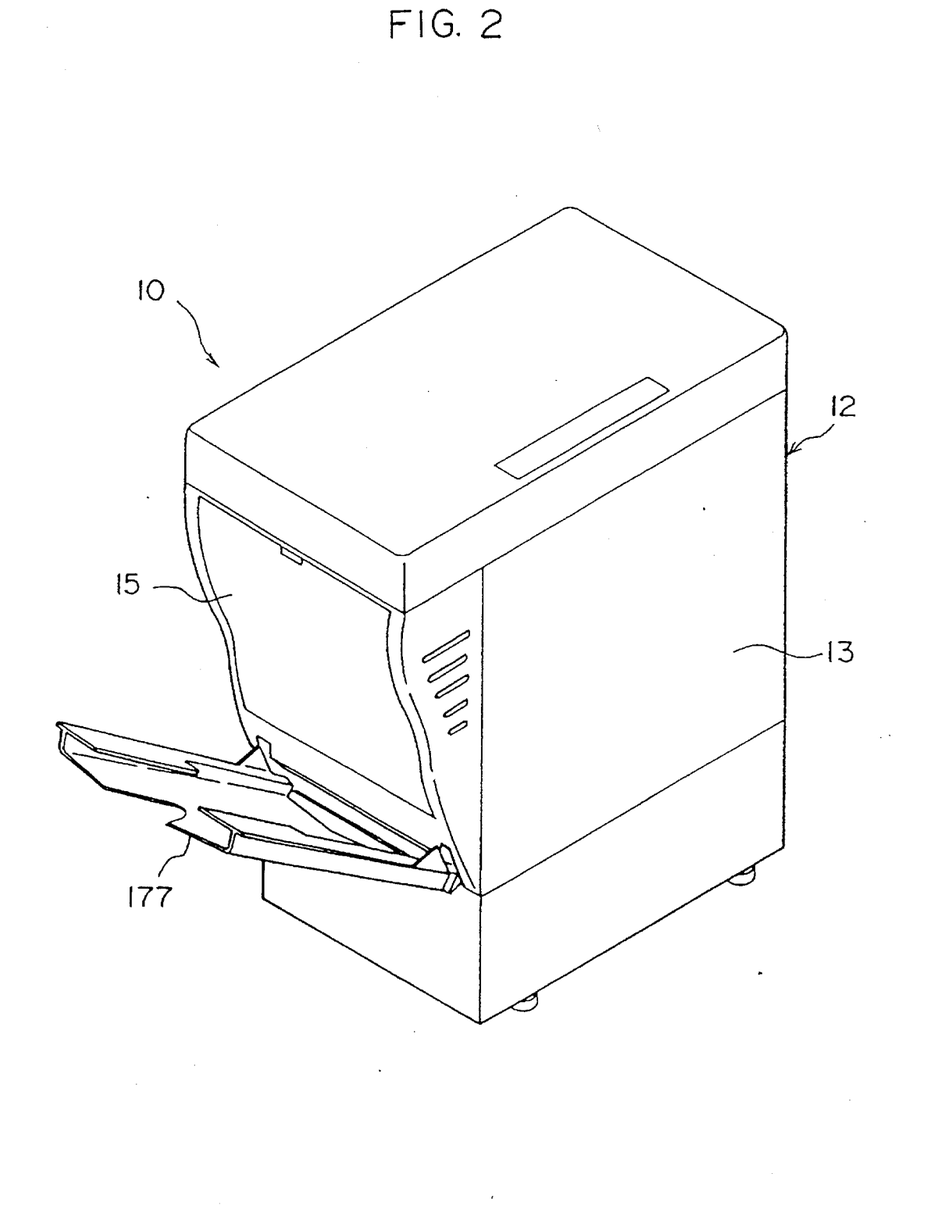
FIG. 2 is an external view showing the image recording apparatus.

FIG. 1 is a sectional view schematically showing the overall construction of an image recording apparatus 10 according to an embodiment of the present invention. FIG. 2 is an external view showing the image recording apparatus 10. The image recording apparatus 10 is constructed in an upright box shape. In FIG. 2, reference numeral 12 is a housing of the image recording apparatus 10. The housing 12 is provided with a front door 13 and a side door 15. By opening the doors 13 and 15, the inside of the image recording apparatus 10 can be accessed. Each door is provided with an interlock mechanism (not shown). Thus, when each door is open, the power of a predetermined portion is turned off.

In the housing 12 of the image recording apparatus 10, a photosensitive material magazine 14 is disposed. In the photosensitive material magazine 14, a photosensitive material 16 is accommodated in rolled form. The width of the photosensitive material 16 is for example 224 mm. The photosensitive material 16 has a photosensitive surface where silver halide, a binder, a dyeing substance, and a reducing agent for each of a plurality of colors are layered on a base. The photosensitive material 16 is rolled in such a way that the photosensitive surface faces inward.

The photosensitive material magazine 14 comprises a body portion and a pair of side frame portions (both of which are not shown). The size of the body portion is designated so that it can contain the photosensitive material 16. The pair of side frame portions are secured to both edge portions of the body portion. The photosensitive material magazine 14 is disposed in a magazine holding portion in the housing 12.

An inner door (not shown) is disposed at an extracting portion of the photosensitive material magazine 14 of the magazine holding portion. While the photosensitive material magazine 14 is held in the magazine holding portion, even if the front door 13 of the housing 12 is opened, the inside of the holding portion is not exposed to outside light. Thus, the photosensitive material 16 held in the magazine holding portion is not unnecessarily exposed.

A nip roller pair 18 and a cutter 20 are disposed in a vicinity of the extracting portion of the photosensitive material magazine 14. The photosensitive material 16 extracted from the photosensitive material magazine 14 is cut by the cutter 20 to a predetermined length. The cutter 20 is for example a rotary type which comprises a fixed blade and a movable blade. The movable blade is vertically moved by a rotation cam or the like to engage the fixed blade so as to cut the photosensitive material 16. After the photosensitive material 16 is cut, the nip roller pair 18 is reversely rotated so that the leading end of the photosensitive material 16 is lightly nipped by the nip roller pair 18 so the material 16 can be rewound.

To the right and above the cutter 20, a plurality of conveying roller pairs 19, 21, 23, 24, and 26, and a guide plate 27 are disposed. The conveying roller pairs 19, 21, 23, 24, and 26 and the guide plate 27 convey and guide the photosensitive material 16 which has been cut to predetermined lengths to an exposure portion 22.

Figure 4A:
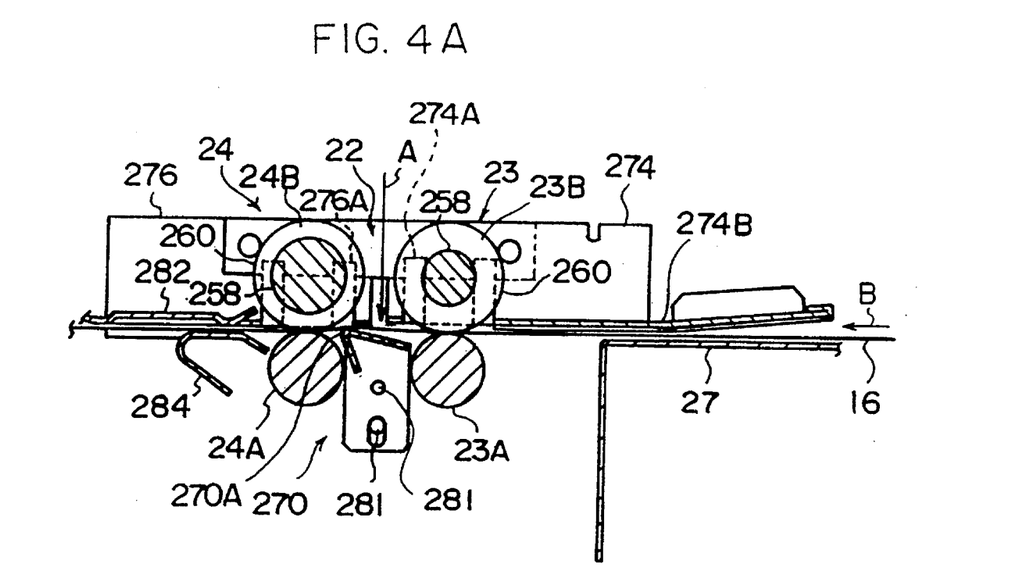
FIG. 4A is an overall view thereof and FIG. 4B is a detailed view of principal portions thereof.
Figure 4B:
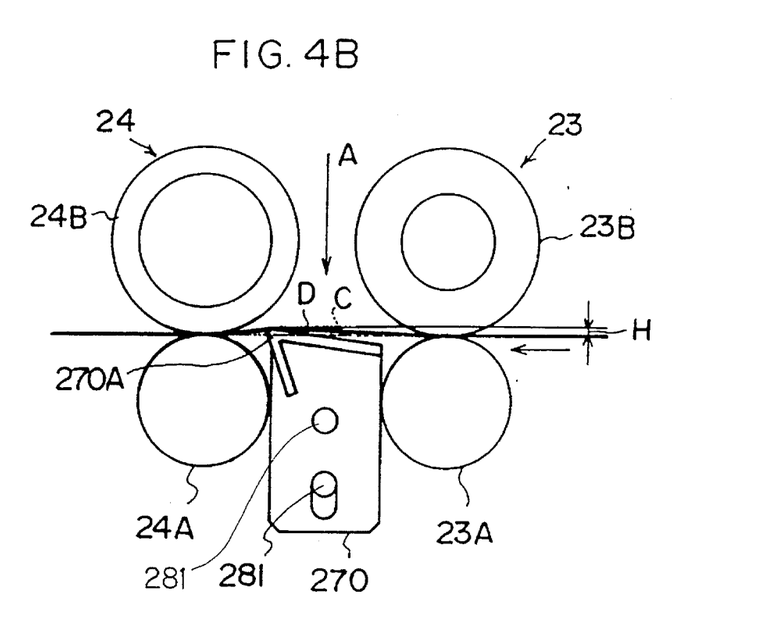

As shown in FIG. 4, the exposure portion 22 is disposed between the conveying roller pairs 23 and 24. The conveying roller pair 23 is disposed on the upstream side of the exposure portion 22, whereas the conveying roller pair 24 is disposed on the downstream side thereof. Between these conveying roller pairs 23 and 24, an exposure point is disposed. Thus, the photosensitive material 16 is nipped by the conveying roller pairs 23 and 24 and passed through the exposure point. The conveying roller pair 23 is constructed of a lower drive roller 23A and an upper rubber roller 23B. The drive roller 23A comes in contact with the rubber roller 23B. Likewise, the conveying roller pair 24 is constructed of a lower drive roller 24A and an upper rubber roller 24B. The drive roller 24A comes in contact with the rubber roller 24B.

Figure 5:
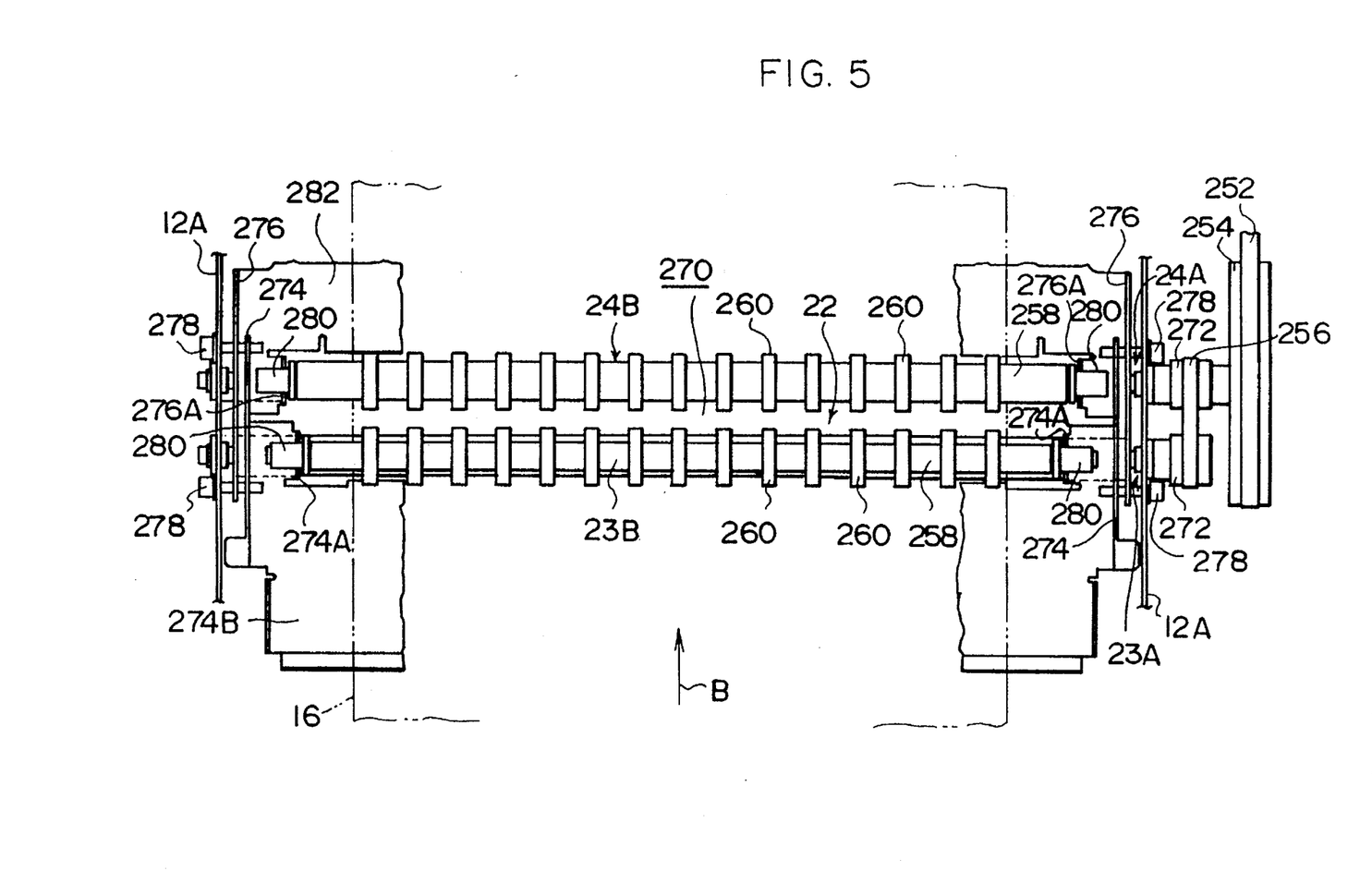
FIG. 5 is a plan view showing the peripheral portions of the exposure portion.

In other words, as shown in FIGS. 4 and 5, each of the drive rollers 23A and 24A is disposed in such a way that the axis thereof extends in the direction perpendicular to a conveying direction B. Both axial end portions of each of the drive rollers 23A and 24A are supported by the housing 12. A pulley 254 is mounted to one axial end portion of the drive roller 23A. A belt 252 is wound around the pulley 254. The drive force of a motor (not shown) is transmitted to the belt 252. A reel 272 is mounted to one axial end portion of the drive roller 23A. Likewise, a reel 272 is mounted to one axial end portion of the drive roller 24A. A belt 256 is wound around the reel 272. Thus, the drive rollers 23A and 24A of the conveying rollers 23 and 24 are rotated at the same speed via the belts 252 and 256.

Figure 4C:
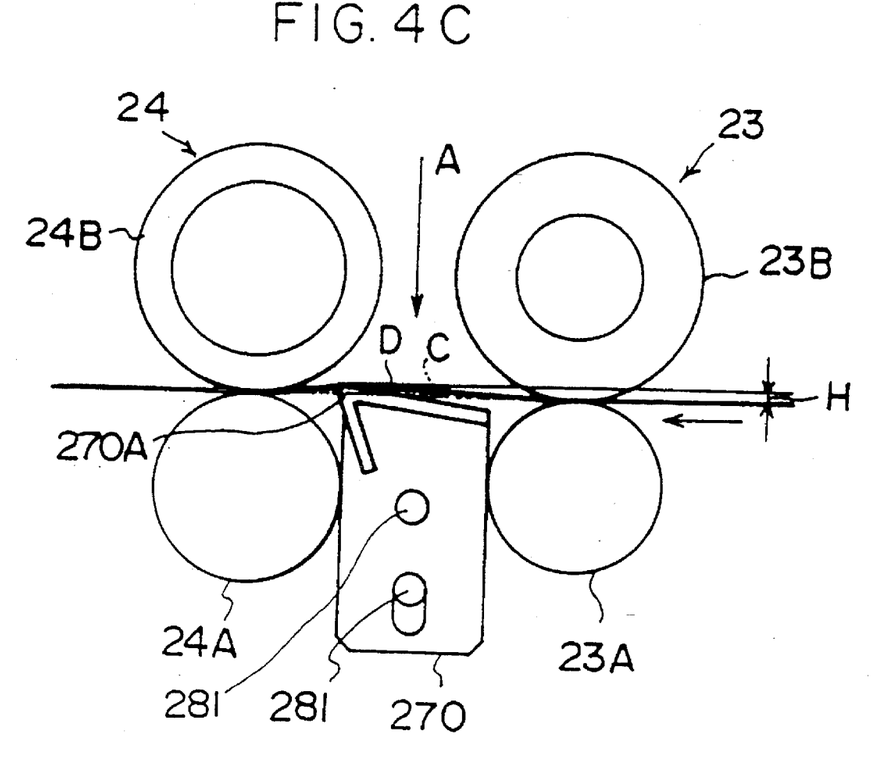
FIG. 4C is, similarly to FIG. 4B, a detailed view of principal portions of peripheral portions of an exposure portion of FIG. 1, in which the difference in sizes of a drive roller 23A and a drive roller 24A is exaggerated.

The different in the sizes of the drive roller 24A and the drive roller 24B is exaggerated in FIG. 4C. The drive rollers 23A and 24A are Teflon coated stainless steel rollers. The outer diameter of the drive roller 24A is for example 14.0 mm, whereas the outer diameter of the drive roller 23A is for example 13.8 mm. In other words, the peripheral surface speed of the drive roller 24A is slightly faster than that of the drive roller 23A. As a result, a back-tension is applied to the photosensitive material 16. The conveying speed of the photosensitive material 16 by the conveying rollers 23 and 24 (namely, the speed that the photosensitive material 16 passes through the exposure portion 22) is for example 12 mm/sec.

A pair of bracket plates 274 and 276 are secured to a front-rear edge portion 12A (which holds the conveying rollers 23 and 24) on each side of the housing 12 by bolts 278. Bearings 280 which rotatably support the rubber rollers 23B and 24B are fitted to support portions 274A and 276A which are curved portions of the bracket plate 274 and 276, respectively. The bearings 280 are tensioned by respective springs (not shown) in the direction perpendicular to the view of FIG. 5. Thus, the rubber rollers 23B and 24B are tensioned to the drive rollers 23A and 24A, respectively.

Shaft portions 258 of the rubber rollers 23B and 24B are made of for example aluminum. A plurality of ring-shaped members 260 made of silicone rubber are adhered at equal intervals to the outer periphery of the shaft members 258. These ring-shaped members 260 come in contact with outer surfaces of the device rollers 23A and 24A.

A guide member 270 which is a pressuring piece extends along the lateral direction of the photosensitive material 16. The guide member 270 is disposed between the conveying roller pairs 23 and 24. Both ends of the guide member 270 are bent. The bent portions of the guide member 270 are secured to the housing 12 by screws 281. The guide member 270 is made of for example Teflon coated stainless steel. An end portion of the guide member 270 is disposed opposite to the conveying roller pair 24 and bent in a V shape. As shown in FIG. 4(b), the upper surface of a V shaped corner portion 270A is higher by for example around 1 mm than the conveying path denoted by dotted line C.

Thus, the photosensitive material 16 conveyed along the guide plate 27 is guided by a guide plate 274B connecting the pair of bracket plates 274 and then conveyed to the conveying roller pair 23 and than to roller pair 24. Thus, the photosensitive material 16 is back-tensioned by the difference of the peripheral speeds of the conveying direction B. Accordingly, the corner portion 270A of the guide member 270 comes in contact with the non-exposure surface of the photosensitive material 16 in the direction perpendicular to the conveying direction B. Thus, at this position, the photosensitive material 16 is raised by a length H for example around 1 mm as shown by dotted line D.

Therefore, the photosensitive material 16 is laterally supported and conveyed by the corner portion 270A and the adjacent portion of the guide member 270. As a result, even if the photosensitive material is thin, it can be stably exposed and conveyed.

Directly above the exposure portion 22, an exposure unit 38 is disposed. The exposure unit 38 comprises laser diodes for three colors, a lens unit, a polygon mirror, and a mirror unit (not shown). The exposure unit 38 irradiates rays of light in the direction of arrow A.

On the downstream side of the conveying roller pair 24, guide plates 282 and 284 are disposed in such a way that they connect the pair of bracket plates 276. Thus, the photosensitive material 16 is guided and conveyed by the guide plates 282 and 284.

As shown in FIG. 1, a switch-back portion 40 is disposed to the left of the exposure portion 22. A water applying portion 62 which is an image-forming-solvent applying portion is disposed below the exposure portion 22. The photosensitive material 16 conveyed from the photosensitive material magazine 14 and exposed by the exposure portion 22 is temporarily conveyed to the switch-back portion 40. Thereafter, the conveying roller 26 is reversely rotated and thereby the photosensitive material 16 is conveyed to the water applying portion 62 through a conveying path disposed below the exposure portion 22.

As shown in FIG. 1, the water applying portion 62 has an application tank 64. A plurality of pipes (not shown) are connected to the application tank 64. Water is supplied to the application tank 64 through these pipes. A pair of supply rollers 66 are disposed at an end portion (on the upstream side) of the application tank 64. In addition, a squeeze roller pair 68 is disposed at another end portion (on the downstream side) of the application tank 64.

The supply roller 66 and the squeeze roller pair 68 are silicone rubber rollers with an outer diameter of for example 20 mm. The rubber hardness of the supply rollers 66 is for example 60±5 deg, whereas the hardness of the squeeze roller pair 68 is for example 40±5 deg. Both axial end portions of each of these rollers are tensioned at a predetermined pressure (for example, 1 kg). In addition, the pair of supply rollers 66 function as a registration roller which corrects the skewing of the photosensitive material 16 conveyed from the switch-back portion 40.

Above the application tank 64, a guide plate 70 is disposed opposite thereto. The guide plate 70 is made of a metal such as aluminum. The photosensitive material 16 passes between the guide plate 70 and the application tank 64. Thus, when the application tank is filled with water, the photosensitive material 16 which has been straightened by the supply roller 66 passes between the guide plate 70 and the application tank 64. Thus, water is applied to the photosensitive material 16. Thereafter, the photosensitive material 16 is nipped and conveyed by the squeeze rollers 68, thereby squeezing excessive water off the photosensitive material 16.

In this embodiment, the length of the photosensitive material 16 to which water is applied (namely, the length of the photosensitive material 16 which passes through water) is for example 100 mm. The period of time for which the photosensitive material 16 is dipped in water is for example 2.5 sec. After the water applying process is performed (namely, the photosensitive material 16 passes through the squeeze roller pair 68), water of 11±1 grams/m$^2$ is applied to the photosensitive material 16.

The application tank 64, the guide plate 70, and the squeeze roller pair 68 combine to form a water applying portion 62 which is a single unit.

As shown in FIG. 1, an image receiving material magazine 106 is disposed to the right of the photosensitive material magazine 14. An image receiving material 108 is accommodated in the image receiving material magazine 106 in roll form. The width of the image receiving material 108 is smaller than the width of the photosensitive material 16 (for example, the width of the image receiving material is 210 mm). A color fixing substance with a mordant agent coats the image forming surface of the image receiving material 108. The image receiving material 108 is rolled in such a way that the image forming surface faces inward.

As with the photosensitive material magazine 14, the image receiving material magazine 106 comprises a body portion and a pair of side frame portions. The pair of side frame portions are secured to both ends of the body portion. The image receiving material magazine 106 can be accessed from the front of the housing 12 (in the direction perpendicular to the view of FIG. 1, namely, in the lateral direction of the image receiving material 108 being rolled). A nip roller pair 110 is disposed in the vicinity of an extracting portion of the image receiving material magazine 106. The nip roller pair 110 serves to extract the image receiving material 108 from the image receiving material magazine 106. In addition, the nip roller 110 can stop extracting the image receiving material 108.

A cutter 112 is disposed to the left of the nip roller pair 110. The construction of the cutter 112 is similar to that of the above-described cutter 20 which cuts the photosensitive material 16. The cutter 112 cuts the image receiving material 108 extracted from the image receiving material magazine 106 into lengths shorter than that of the photosensitive material 16.

An image receiving material conveying portion 180 is disposed to the left of the cutter 112. The image receiving material conveying portion 180 comprises conveying roller pairs 186, 190, and 114, and a guide plate 182 which convey and guide the image receiving material 108 to a heat development and transfer portion 104. The conveying roller pair 114 functions as a registration roller which corrects the skewing of the image receiving material 108 conveyed from the image receiving material conveying portion 180. Thus, the image receiving material 108 is straightened and conveyed by the conveying roller pair 114.

Figure 6:
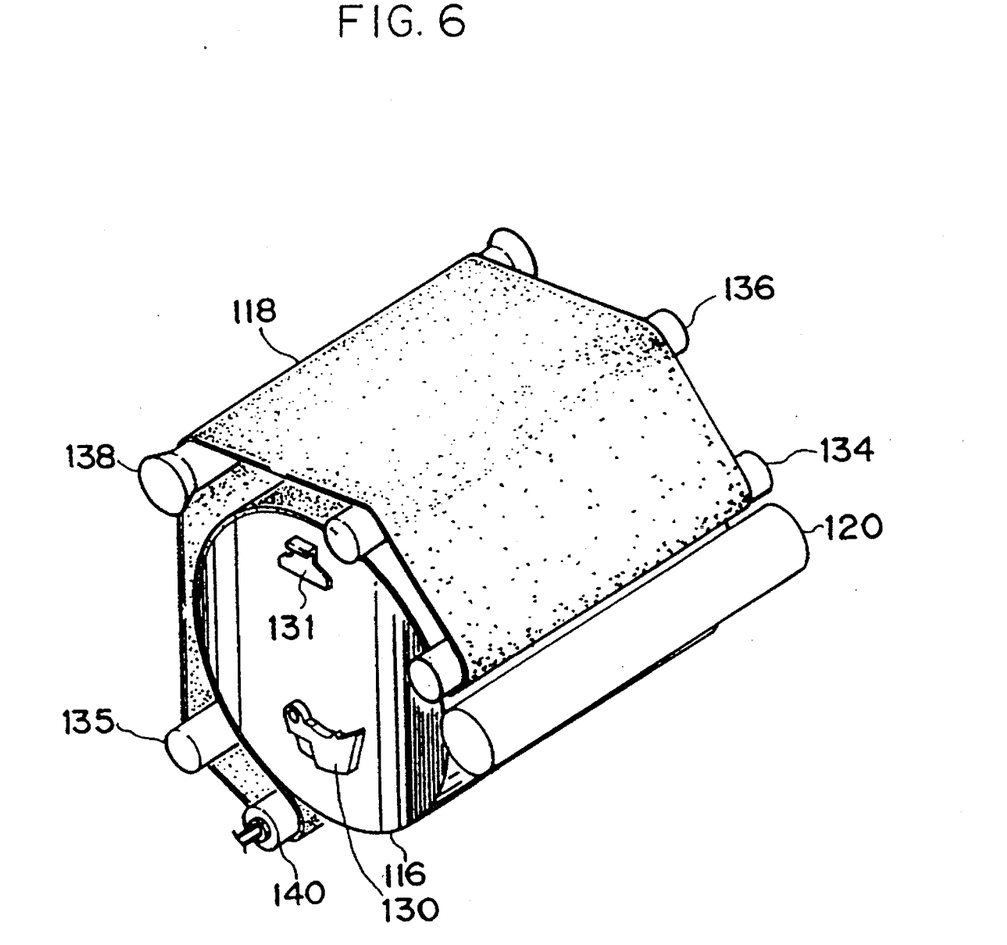
FIG. 6 is a perspective view showing a heating drum of a heat development and transfer portion.

As shown in FIG. 6, the heat development and transfer portion 104 comprises a heating drum 116 and an endless resilient belt 118. An affixing roller 120 is disposed on the outer periphery of the heating drum 116 and to the left of the water applying portion 62.

A guide plate 122 is disposed between the affixing roller 120 and the squeeze rollers 68 of the water applying portion 62. The guide plate 122 comes in contact with the rear surface of the photosensitive material (opposite to the image forming surface) conveyed from the squeeze rollers 68 and guides it to the affixing roller 120.

A blade guide 124 is disposed opposite the guide plate 122. The blade guide 124 is disposed between the affixing roller 120 and the conveying roller pair 114 which conveys the image receiving material 108. The blade guide 124 comes in contact with the image receiving material 108 and guides it to the affixing roller 120. A dust removing sheet is affixed to the front surface of the blade guide 124. The dust removing sheet removes dust which adheres to the image receiving material 108.

The outer diameter at an axial center portion of the affixing roller 120 is for example 22 mm. Silicone rubber coats the outer peripheral surface of the affixing roller 120. The thickness of the silicone rubber is for example around 2.35 mm. The hardness of the silicone rubber is approximately 40 deg. Both axial end portions of the affixing roller 120 are tensioned to the outer periphery of the heating drum 116 at a predetermined pressure (for example, 9 kg). The affixing roller 120 is connected to a drum motor 200 via a drive system (not shown). The drive force of the drum motor 200 is transmitted to the affixing roller 120. The conveying speed of the photosensitive material 16 and the image receiving material 108 by the affixing roller 120 is slightly (by approximately 2 %) slower than that of the squeeze roller pair 68 and the transferring roller pair 114. Thus, back-tension is applied to the photosensitive material 16 and the image receiving material 108 when conveyed to the affixing roller 120.

The heating drum 116 is made of a thin-walled aluminum pipe. In the embodiment, the wall thickness, the outer diameter, and the effective axial width of the heating drum 116 are 3 mm, 166 mm, and 300 mm, respectively. The outer and inner peripheral surfaces of the heating drum 116 are subjected to black alumite processing.

Figure 7:
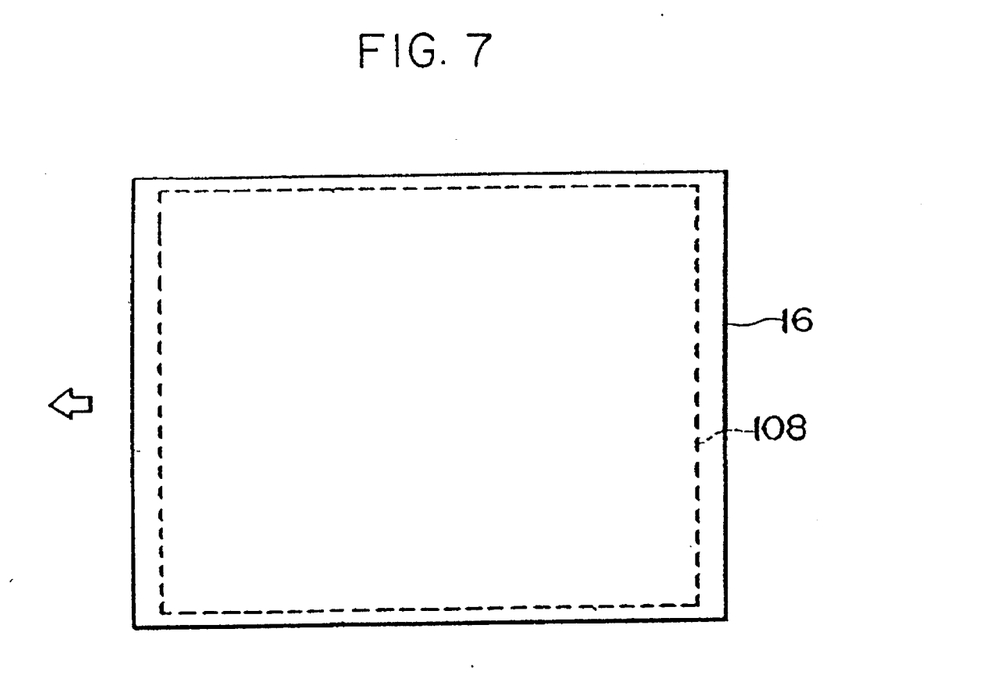
FIG. 7 is a plan view showing a superimposed state of a photosensitive material and an image receiving material.

In the heat development and transfer portion 104, the photosensitive material 16 is conveyed between the affixing roller 120 and the heating drum 116. On the other hand, the image receiving material 108 is conveyed in synchronization with the conveyance of the photosensitive material 16. The image receiving material 108 and the photosensitive material 16 are conveyed between the affixing roller 120 and the heating drum 116 and are superimposed on each other in such a way that the photosensitive material 16 is ahead of the image receiving material 108 by a predetermined length (in this embodiment, 20 mm). In this case, since both the length and width of the image receiving material 108 are smaller than those of the photosensitive material 16, as shown in FIG. 7, the peripheral portion of the photosensitive material 16 fully extends from that of the image receiving portion 108. In this condition, these materials 16 and 108 are superimposed.

A cam 130 and a filler 131 are secured to a side wall of the heating drum 116. This cam 130 is engaged with peeling nails 154 and 176 (which will be described later). As the heating drum 116 is rotated, the peeling-off blades 154 and 176 are rotated. The filler 131 is used to detect the alignment of the heating drum 116, the photosensitive material 16, and the image receiving material 108.

A pair of halogen lamps 132A and 132B are disposed in the heating drum 116. The halogen lamps 132A and 132B have outputs of for example 400 W and 450 W, respectively. Thus, the halogen lamps 132A and 132B cause the temperature of the outer surface of the heating drum 116 to rise (for example, to around 82° C.). In this embodiment, when the temperature of the heating drum 116 is raised, both the halogen lamps 132A and 132B are used. Thereafter, in normal operation, only the halogen lamp 132A is used.

The endless resilient belt 118 is in resilient contact with the outer periphery of the heating drum 116. The endless resilient belt 118 is made of rubber-coated fabric material. In this embodiment, the width of the endless resilient belt 118 is 224 mm. The fabric material is woven of heat resisting fibers such as aromatic polyamide fibers (for example, Kevlar or Nomex, each of which is a registered trademark of DuPont Corp). The coated rubber is an electro-conductive silicone rubber containing carbon.

The endless resilient belt 118 is wound around five belt-winding rollers 134, 135, 136, 138, and 140. Thus, an outer periphery formed between the belt-winding rollers 134 and 140 is in pressingly contact with the outer periphery of the heating drum 116.

Figure 8:
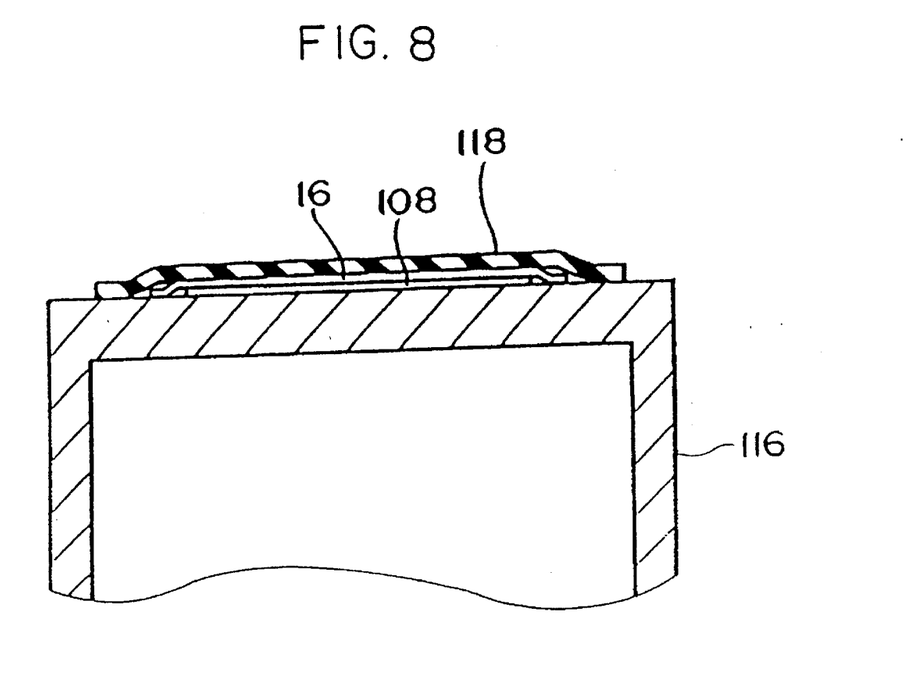
FIG. 8 is a partial sectional view showing the photosensitive material, the image receiving material, the heating drum, and an endless resilient belt where the photosensitive material and the image receiving material are affixed to the heating drum and the endless resilient belt.

In this embodiment, as shown in FIG. 8, the photosensitive material 16 and the image receiving material 108 are nipped between the endless resilient belt 118 and the heating drum 116. The photosensitive material 16 is positioned on the image receiving material 108 in such a way that both lateral edge portions of the photosensitive material 16 extend from those of the image receiving material 108. Thus, the extended portions come in tight contact with the outer periphery of the heating drum 116. Accordingly, the inner image receiving material 108 is wrapped up in the outer photosensitive material 16. Thus, since both the materials are strongly adhered to each other, they do shift or slide.

The belt-winding rollers 134, 135, 136, and 138 are made of stainless steel. Both axial end portions of the belt-winding roller 138 gradually and outwardly widen. The both axial end portions of the belt-winding roller 138 are tensioned at a pressure of 2.0 kg (practically, in the range from 1.0 to 3.0 kg) in the direction of moving away from the heating drum 116. Thus, the endless resilient belt 140 can be kept tensioned at a predetermined pressure. In addition, the endless resilient belt 118 can be prevented from moving to one side of the heating drum 116.

The belt-winding roller 140 is a rubber roller and is connected to the drum motor 200 via a drive system (not shown). The drive force of the drum motor 200 is transmitted to the belt-winding roller 140. Thus, the belt-winding roller 140 is rotated. As the belt-winding roller 140 is rotated, the endless resilient belt 118 which is wound around the belt-winding roller 140 is rotated. Thus, the rotating force of the endless resilient belt 118 is transmitted to the heating drum 116 by frictional force which occurs between the endless resilient belt 118 and the heating drum 116. Thus, the heating drum 116 is rotated as a follower. The peripheral rotation speed of the heating drum 116 is 40 mm/sec.

The drum motor 200 drives a plurality of drive portions, which are the belt-winding roller 140, the affixing roller 120, the squeeze roller pair 68, a bend and guide roller 142, a peel-off roller 174, photosensitive material discharge roller pairs 158 and 160, and image receiving material discharge roller pairs 172, 173, and 175 (which will be described later).

The photosensitive material 16 and the image receiving material 108 which have been superimposed onto each other by the affixing roller 120 are nipped and conveyed by the heating drum 116 and the endless resilient belt 118 by nearly ⅔ turns of the outer periphery of the heating drum 116 (between the belt-winding rollers 134 and 140). After the photosensitive material 16 and the image receiving material 108 which have been affixed are fully positioned between the heating drum 116 and the endless resilient belt 118, the rotation of the heating drum 116 is temporarily stopped (for example, for 5 to 15 sec.). In this position, the photosensitive material 16 and the image receiving material 108 are heated. When the photosensitive material 16 is heated while it is being nipped and conveyed or while it is stopped, it gives off at least one transferable dye. The dye is transferred to a dye fixing layer and thereby an image is obtained.

Figure 3:
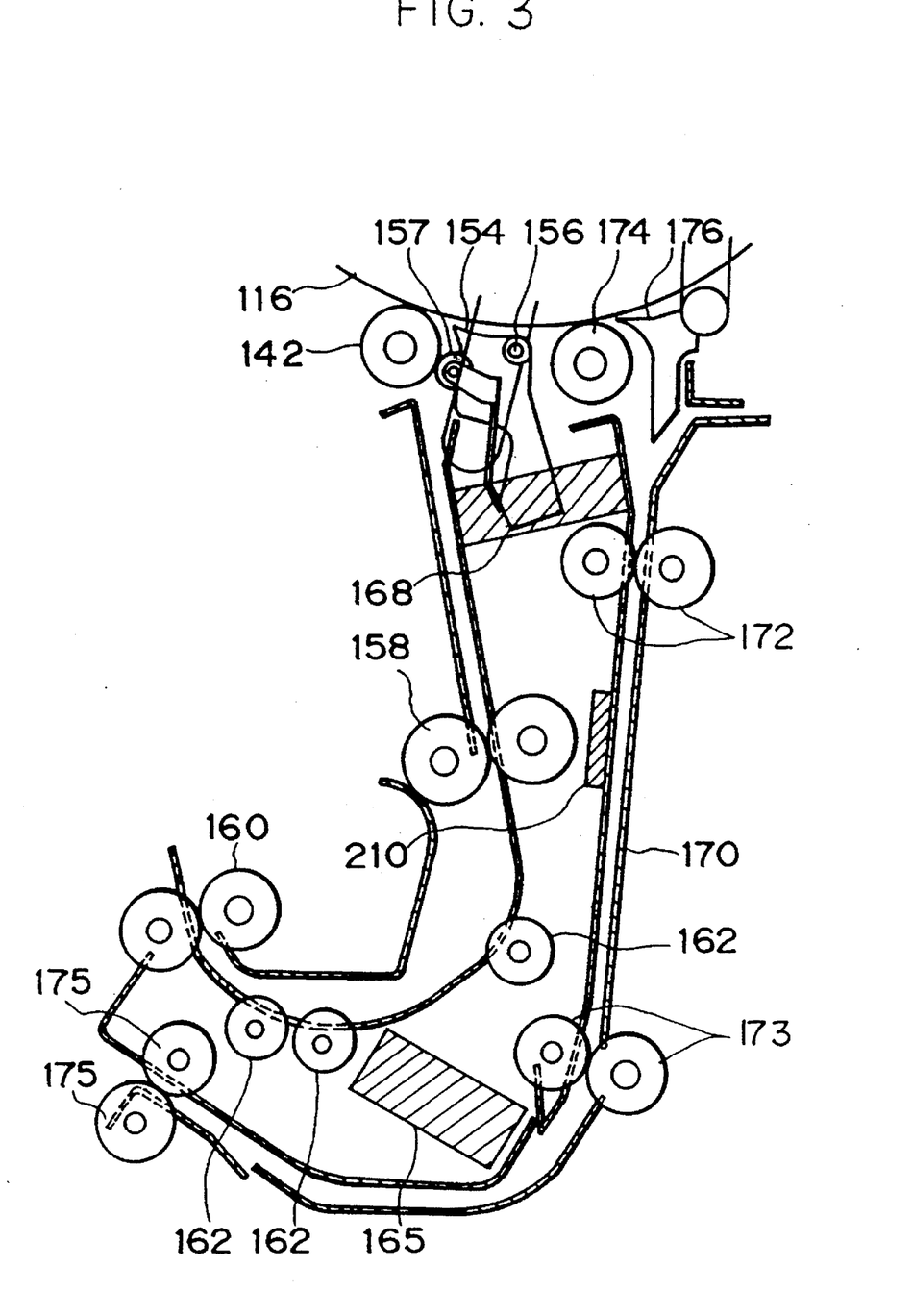
FIG. 3 is an enlarged sectional view showing principal portions of discharge conveying path of a photosensitive material and an image receiving material of FIG. 1.

As shown in FIG. 3, below the heating drum 116 (namely, on the downstream side of the conveying path of the endless resilient belt 118), the bend and guide roller 142 is disposed. The bend and guide roller 142 is made of silicone rubber. The bend and guide roller 142 is rotated by the drive force of the drum motor 200. The bend and guide roller 142 is tensioned to the outer periphery of the heating drum at a predetermined pressure (for example, 800 grams). Thus, the photosensitive material 16 and the image receiving material 108 conveyed by the heating drum 116 and the endless resilient belt 118 are further nipped and conveyed.

Below the heating drum 116 on the downstream side of the bend and guide roller 142, the peeling-off blade 154, and a pinch roller 157 are disposed. The peeling-off blade 154 is pivotally mounted to a shaft 156.

The peeling-off blade 154 is disposed opposite to the outer periphery of the heating drum 116. The peeling-off blade 154 comes in contact with and moves away from the heating drum 116 corresponding to the operation of the above-described cam 130. While the peeling-off blade 154 is in contact with the heating drum 116, it is engaged with only the leading end portion of the photosensitive material 16 of the superimposed materials 16 and 108 which are nipped and conveyed between the endless resilient belt 118 and the heating drum 116. Thus, the leading end portion is peeled off from the outer periphery of the heating drum 116. On the other hand, the pinch roller 157 is operated in association with the peeling-off blade 154. When the peeling-off blade 154 moves away from the heating drum 116, the pinch roller 157 comes in contact with the bend and guide roller 142 at a predetermined pressure (for example, 600 grams). The photosensitive material 16 which has been peeled off by the peeling-off blade 154 is pressured by the pinch roller 157 and wound around the bend and guide roller 142. The bend and guide roller 142 guides the photosensitive material 16 downward.

Below the bend and guide roller 142 and the peeling-off blade 154, the photosensitive material discharge roller pairs 158 and 160 and a plurality of guide rollers 162 are disposed. These rollers convey the photosensitive material 16 from the bend and guide roller 142 to a waste box 178 for photosensitive material. The photosensitive material discharge roller pairs 158 and 160 are rotated by the drive force of the drum motor 200 which drives the heat development and transfer portion 104. The rotation speed of the photosensitive material discharge roller pairs 158 and 160 is slower than the peripheral speed of the heating drum 116 by 1 to 3% so as to cause tension in the photosensitive material 16.

A drying fan 165 is disposed in the vicinity of the guide rollers 162 so as to accelerate the drying of the photosensitive material 16.

As shown in FIG. 3, the peel-off roller 174 and the peeling-off blade 176 are disposed in the vicinity of the heating drum 116 and to the right of the bend and guide roller 142. The peel-off roller 174 is made of silicone rubber. The surface roughness of the peel-off roller 174 is 25 S or more. The peel-off roller 174 is rotated by the drive force of the drum motor 200. The peel-off roller 174 comes in contact with the outer periphery of the heating drum 116 at a predetermined pressure (for example, 800 grams). Thus, the peel-off roller 174 and the peeling-off blade 176 associatively peel off the image receiving material 108 from the outer periphery of the heating drum 116 and guide it downward.

Below the peel-off roller 174 and the peeling-off blade 176, an image receiving material guide 170 and image receiving material discharge roller pairs 172, 173, and 175 are disposed. These rollers guide and convey the image receiving material 108 which has been peeled off from the heating drum 116 by the peel-off roller 174 and the peeling-off blade 176.

Each of the image receiving material discharge roller pairs 172, 173, and 175 is tensioned at a pressure (nipping force) in the range from 100 to 300 grams (a nipping force in the range from 50 to 150 grams at each axial end portion thereof).

A drum fan 168 which is a drying means is disposed in the vicinity of the peel-off roller 174. The image receiving material 108 which is dried by the heat of the heating drum 116 is also dried by the air of the drum fan 168. The drum fan 168 is operated corresponding to atmospheric conditions so as to keep the temperature distribution of the heating drum 116 constant. In addition, a ceramic heater 210 which is also a drying means, is disposed on the image receiving guide 170. The ceramic heater 210 further accelerates the drying of the image receiving material 108 being conveyed. The temperature of the ceramic heater 210 is set at 70° C.

The image receiving material 108 which has been dried by the drum fan 168 and peeled off from the outer peripheral surface of the heating drum 116 by the peeling-off blade 176 is conveyed by the above-described image receiving material guide 170 and the image receiving material discharge roller pairs 172, 173, and 175 and then discharged in to a tray 177.

The heat development and transfer portion 104 is constructed as a single unit. The heat development and transfer portion 104 is accessible in the reverse direction of the water applying portion 62 (namely, on the opposite side of the photosensitive material magazine 14 and the image receiving material magazine 106). Thus, even if the photosensitive material 16 and the image receiving material 108 are jammed in the middle of the conveying path, by opening the side door 15 of the housing 12 and moving the heat development and transfer portion 104 toward the user, these materials 16 and 108 can be easily removed.

Next, the operation of the embodiment of the present invention will be described.

In the image recording apparatus 10, after the photosensitive material magazine 14 is set, the nip roller 18 is operated and thereby the photosensitive material 16 is extracted therefrom by the nip roller 18. When the photosensitive material 16 is extracted by a predetermined length, the cutter 20 is operated and thereby cuts the photosensitive material 16 into predetermined lengths.

After the cutter 20 is operated, the photosensitive material 16 which has been cut is conveyed by the conveying roller pairs 19, 21, 23, 24, and 26. The photosensitive material 16 is conveyed to the exposure portion 22 in such a way that the exposure surface faces upward. When the photosensitive material 16 is nipped by the conveying roller pair 23, its operation is temporarily stopped. Thus, the conveying of the photosensitive material 16 is stopped just before the exposure portion 22.

Thereafter, the driving of the conveying roller pairs 23 and 24 is beginning and thereby the photosensitive material 16 passes through the exposure portion 22 at a predetermined speed. While the photosensitive material 16 is being conveyed (namely, it is passing through the exposure portion 22), the exposure unit 38 scans and exposes the photosensitive material 16 at the exposure portion 22.

The conveying roller pairs 23 and 24 disposed on the upstream and downstream sides of the exposure portion 22 back-tension the photosensitive material 16. In addition, the guide member 270 slightly raises the photosensitive material 16 (see FIG. 4). Thus, while the photosensitive material 16 which is passing between the conveying roller pairs 23 and 24 is exposed, it is guided and supported by the guide member 270. As a result, even if the photosensitive material 16 is made of a thin material, it is stably conveyed between the conveying roller pairs 23 and 24 without the occurrence of skewing. Thus, fluctuation of amount of exposure on the photosensitive material 16 can be suppressed.

Therefore, the image quality of the image receiving material 108 where an image is formed by heat development and transfer process corresponding to image exposure light of the photosensitive material 16 is improved.

In addition, since the photosensitive material 16 is supported by the guide material 270 which is between the conveying roller pairs 23 and 24, even if the skewing of the photosensitive material 16 cannot be satisfactorily suppressed, the characteristic frequency of the sheet-shaped photosensitive material 16 increases. Thus, the amplitude of the photosensitive material 16 between the conveying roller pairs 23 and 24 decreases. As a result, the dislocation of photosensitive material 16 at the exposure point is suppressed, thereby further reducing the fluctuation of the amount of exposure light.

After the photosensitive material 16 is exposed, it is temporarily conveyed to the switch-back portion 40. Thereafter, the conveying roller 26 is reversely rotated and thereby the photosensitive material 16 is conveyed to the water applying portion 62.

In the water applying portion 62, the photosensitive material 16 is conveyed between the guide plate 70 and the application tank 64 by the supply rollers 66. Thereafter, the photosensitive material 16 is nipped and conveyed by the squeeze roller pair 68. In the water application tank 64, water is replenished by a pump (not shown). Thus, water is applied to the photosensitive material 16 which has been conveyed between the guide plate 70 and the water application tank 64. The squeeze roller pair 68 squeezes excessive water from the photosensitive material 16. Thereafter, the photosensitive material 16 is conveyed to the heat development and transfer portion 104 by the squeeze roller 68.

As the photosensitive material 16 is scanned and exposed, the image receiving material 108 is also extracted from the image receiving material magazine 108 by the nip roller pair 110 and then conveyed. When the image receiving material 108 is extracted by a predetermined length, the cutter 112 is operated and thereby the image receiving material 108 is cut by the predetermined length.

Thereafter, the image receiving material 108 is guided by the guide plate 182 of the image receiving material conveying portion 180 and conveyed by the conveying roller pairs 190, 186, and 114. After the image receiving material 108 is cut, the nipping force of the nip roller pair 110 is released, thereby preventing the image forming surface of the image receiving material 108 from being deformed and physically deteriorated.

When the leading end portion of the image receiving material 108 is nipped by the conveying roller pair 114, its conveyance is stopped just before the heat development and transfer portion 104.

When the photosensitive material 16 is conveyed between the outer periphery of the heating drum 116 and the affixing roller 120 by the squeeze roller 68, the conveying of the image receiving material 108 is resumed. Thus, the image receiving material 108 is conveyed to the affixing roller 120 of the heat development and transfer portion 104. In addition, the heating drum 116 is operated.

Since the guide plate 122 is disposed between the affixing roller 120 and the squeeze roller pair 68 of the water applying portion 62, the photosensitive material 16 conveyed from the squeeze roller pair 68 is securely guided to the affixing roller 120. In addition, since the blade guide 124 is disposed between the affixing roller 120 and the conveying roller pair 114, the image receiving material 108 is also securely guided to the affixing roller 120. Moreover, since the photosensitive material 16 and the image receiving material 108 are back-tensioned by the affixing roller 120, they are conveyed without the occurrence of wrinkles.

Thereafter, the image receiving material 108 is conveyed to the heat development and transfer portion 104 in synchronization with the conveying of the photosensitive material 16. The photosensitive material 16 and the image receiving material 108 are conveyed between the affixing roller 120 and the heating drum 116 in such a way that the former is ahead of the latter. Thus, the photosensitive material 16 and the image receiving material 108 are affixed as shown in FIG. 7.

The photosensitive material 16 and the image receiving material 108 which have been superimposed on each other by the affixing roller 120 are nipped between the heating drum 116 and the endless resilient belt 118 and conveyed approximately ⅔ of a turn of the outer periphery of the heating drum 116. When the photosensitive material 16 and the image receiving material 108 are fully positioned between the heating drum 116 and the endless resilient belt 118, the rotation of the heating drum 116 is temporarily stopped and then the photosensitive material 16 and the image receiving material 108 are heated. At this time, the photosensitive material 16 gives off at least one dye. The dye is transferred to the dye fixing layer of the image receiving material 108 and thereby an image is obtained thereon.

In this embodiment, since the image receiving material 108 is positioned below the photosensitive material 16, the former is wrapped by the latter and thereby a necessary frictional force takes place. Thus, both the materials are securely affixed. Therefor, even if a shearing stress is applied between both the photosensitive material 16 and the image receiving material 108 due to a slight difference between the rotation speeds of the endless resilient belt 118 and the heating drum 116, since these materials do not slip or slide.

Thus, a good image free of transfer dislocation can be obtained.

In addition, since the endless resilient belt 118 is electroconductive, static electricity does not take place between any two portions of the endless resilient belt 118, the heating drum 116, the photosensitive material 16, and the image receiving material 108, and the image obtained on the image receiving material 108 is free from fogging.

When the photosensitive material 16 and the image receiving material 108 are nipped and conveyed to a lower position of the heating drum 116, the peeling-off blade 154 is moved by the cam 130. The peeling-off blade 154 engages the leading end portion of the photosensitive material 16 which is conveyed ahead of the image receiving material 108 by the predetermined length. Thus, the leading end portion of the photosensitive material 16 is peeled off from the outer periphery of the heating drum 16. When the peeling-off blade 154 is returned to the original position, the pinch roller 157 applies pressure to the photosensitive material 16. Thus, the photosensitive material 16 is wound around the bend and guide roller 142 and conveyed downward.

Since the bend and guide roller 142 is made of silicone rubber, the nipping force of the photosensitive material 16 by the bend and guide roller 142 and the pinch roller 157 is larger than the affixing force of the photosensitive material 16 and the image receiving material 108. Therefore, the photosensitive material 16 is securely peeled off from the image receiving material 108. Thus, in this portion, no paper jamming takes place.

The photosensitive material 16 wound around the bend and guide roller 142 is guided by the guide roller 162 and then conveyed by the photosensitive material discharge roller pairs 158 and 160. At this time, the photosensitive material 16 is dried by the drying fan 165 and then discharged in to the waste photosensitive material box 178.

On the other hand, the image receiving material 108 which has been separated from the photosensitive material 16 and which is in contact with the heating drum 116 is conveyed to the peel-off roller 174. When the leading end portion of the image receiving material 108 is nipped between the peel-off roller 174 and the heating drum 116, the peeling-off blade 176 is moved by the cam 130. Thereafter, the peeling-off blade 176 engages the leading end portion of the image receiving material 108 and thereby the image receiving material 108 is peeled off from the outer periphery of the heating drum 116.

Since the peel-off roller 174 is made of silicone rubber, the photosensitive material 16 is easily conveyed between the peel-off roller 174 and the heating drum 116. Thus, the image receiving material 108 never gets loose between the peel-off roller 174 and the bend and guide roller 142. In other words, since there is no slackness of the image receiving material 108, it never comes in contact with the peeling-off blade 154 and a trace never takes place on the image receiving material 108.

The image receiving material 108 peeled off from the outer periphery of the heating drum 116 by the peeling-off blade 176 is wound around the peel-off roller 174 and conveyed downward. Thereafter, the image receiving material 108 is guided by the image receiving material guide 170 and then conveyed by the image receiving material discharge roller pairs 172, 173, and 175. Thereafter, the image receiving material 108 is dried by the drum fan 168 and the ceramic heater 210 and then discharged in to the tray 177.

When images are recorded on a plurality of paper sheets, the above-described steps are repeatedly and successively performed.

As described above, in the image recording apparatus 10, the image receiving material 108 is wound around the heating drum 116 and then a certain image is formed (recorded) by the heat development and transfer process. Thereafter, the image receiving material 108 is peeled off from the heating drum 116. Next, the image receiving material 108 is dried by the drying means which are the drum fan 168, the ceramic heater 210, and so forth. Thereafter, the image receiving material 108 is nipped and conveyed by the image receiving material unload roller pairs 172, 173, and 175 to the outside of the apparatus.

In this embodiment, the photosensitive material 16 and the image receiving material 108 were used as the image recording materials. After the photosensitive material 16 and the image receiving material 108 were exposed, they were conveyed in such a way that the former is positioned over the latter. However, the present invention is not limited to this construction. Instead, when the photosensitive material 16 and the image receiving material 108 are conveyed, the former may be positioned below the latter. Moreover, the present invention may be applied to other than the above-described materials. In other words, cut-sheet type or roll-type image recording materials may be used.

Furthermore, in the above-described embodiment, the guide member 270 came in contact with the photosensitive material 16 in the vicinity of the downstream side of the exposure point where the photosensitive material 16 was exposed to the light A. However, the present invention is not limited to this construction. Instead, the guide member 270 may come in contact with the photosensitive material 16 in the vicinity on the upstream side of the exposure point or at the exposure point.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An image recording apparatus, comprising:

an exposure portion for exposing an image on a first image recording material so as to form an image thereon;

a first conveying roller pair disposed on an upstream side of said exposure portion and adapted for nipping and conveying said first image recording material;

a second conveying roller pair disposed on a downstream side of said exposure portion and adapted for nipping and conveying said first image recording material;

a pressuring piece disposed between said first and second conveying roller pairs, said pressuring piece extending along the lateral direction of said first image recording material and having a distal edge in line contact with a non-exposure surface of said first image recording material along a line which intersects a conveying direction of said first image recording material, said distal edge being positioned so as to extend over a conveying path of said first image recording material formed by said first and second conveying roller pairs and so as to press said first image recording material in a direction in which an exposure surface of said first image recording material is oriented;

an image-forming-solvent applying portion disposed on a downstream side of said second conveying roller pair and adapted for conveying and applying an image forming solvent onto said first image recording material; and a heating drum for superimposing said first image recording material and a second image recording material together, for winding said first and second image recording materials therearound, and for heating said first and second image recording materials so as to heat develop and transfer an image of said first image recording material to said second image recording material.

2. An image recording apparatus according to claim 1, wherein said exposure portion has an exposure point for scanning and exposing said first image recording material so as to form an image thereon.

3. An image recording apparatus according to claim 1, wherein said first and second conveying roller pairs each have a drive roller and a follower roller, the drive roller being rotated, the follower roller being in contact with the drive roller.

4. An image recording apparatus according to claim 1, wherein said first and second conveying roller pairs each have a drive roller and a follower roller, the drive roller being made of Teflon coated stainless steel and rotated, the follower roller being made of rubber and in contact with the drive roller.

5. An image recording apparatus according to claim 4, wherein the follower rollers of said first and second conveying roller pairs each comprise an axial member and a plurality of ring-shaped members, the ring-shaped members being adhered to the outer periphery of the axial member at equal intervals.

6. An image recording apparatus according to claim 1, wherein said image-forming-solvent applying portion is constructed of a water applying portion for applying water as an image forming solvent onto said first image recording material.

7. An image recording apparatus according to claim 1, wherein said image-forming-solvent applying portion has a squeeze roller pair for squeezing and removing excess image forming solvent, so as to apply only a proper amount of image forming solvent onto said first image recording material.

8. An image recording apparatus according to claim 1, wherein said heating drum contains a halogen lamp for heating said first and second image recording materials, so as to heat develop and transfer an image from a photosensitive material as said first image recording material to an image receiving material as said second image recording material.

9. An image recording apparatus, comprising:

an exposure portion for exposing an image on a first image recording material so as to form an image thereon;

a first conveying roller pair disposed on an upstream side of said exposure portion and adapted for nipping and conveying said first image recording material;

a second conveying roller pair disposed on a downstream side of said exposure portion and adapted for nipping and conveying said first image recording material;

a pressuring piece disposed between said first and second conveying roller pairs, said pressuring piece extending along the lateral direction of said first image recording material and being in contact with a non-exposure surface thereof;

an image-forming-solvent applying portion disposed on a downstream side of said second conveying roller pair and adapted for conveying and applying an image forming solvent onto said first image recording material; and a heating drum for superimposing said first image recording material and a second image recording material together, for winding said first and second image recording materials therearound, and for heating said first and second image recording materials so as to heat develop and transfer an image of said first image recording material to said second image recording material, wherein said first and second conveying roller pairs each have a drive roller and a follower roller, the drive roller being rotated, the follower roller being in contact with the drive roller, and wherein the outer diameter of the drive roller of said first conveying roller pair is smaller than the outer diameter of the drive roller of said second conveying roller pair, so as to create tension in said first image recording material due to the difference of peripheral speeds of said first and second conveying roller pairs.

10. An image recording apparatus, comprising:

an exposure portion for exposing an image on a first image recording material so as to form an image thereon;

a first conveying roller pair disposed on an upstream side of said exposure portion and adapted for nipping and conveying said first image recording material;

a second conveying roller pair disposed on a downstream side of said exposure portion and adapted for nipping and conveying said first image recording material;

a pressuring piece disposed between said first and second conveying roller pairs, said pressuring piece extending along the lateral direction of said first image recording material and having a contacting portion which contacts a non-exposure surface of said first image recording material along a direction intersecting a conveying direction of said first image recording material, said contacting portion being positioned so as to extend over a conveying path of said first image recording material formed by said first and second conveying roller pairs and so as to press said first image recording material in a direction in which an exposure surface of said first image recording material is oriented;

an image-forming-solvent applying portion disposed on a downstream side of said second conveying roller pair and adapted for conveying and applying an image forming solvent onto said first image recording material; and a heating drum for superimposing said first image recording material and a second image recording material together, for winding said first and second image recording materials therearound, and for heating said first and second image recording materials so as to heat develop and transfer an image of said first image recording material to said second image recording material, wherein said pressuring piece is V-shaped and is made of stainless steel or of Teflon-coated stainless steel, the distal end portion thereof being in contact with said first image recording material so as to raise said material.

11. An image recording apparatus, comprising:

an exposure portion for exposing an image on a first image recording material so as to form an image thereon;

a first conveying roller pair disposed on an upstream side of said exposure portion and adapted for nipping and conveying said first image recording material;

a second conveying roller pair disposed on a downstream side of said exposure portion and adapted for nipping and conveying said first image recording material and for tensioning said first image recording material along with said first conveying roller pair, the peripheral speed of said second conveying roller pair being higher than the peripheral speed of said first conveying roller pair;

a pressuring piece disposed between said first and second conveying roller pairs, said pressuring piece extending along the lateral direction of said first image recording material and having a distal edge in line contact with a non-exposure surface of said first image recording material along a line which intersects a conveying direction of said first image recording material, said distal edge being positioned so as to extend over a conveying path of said first image recording material formed by said first and second conveying roller pairs and so as to press said first image recording material in a direction in which an exposure surface of said first image recording material is oriented;

an image-forming-solvent applying portion for conveying and applying an image forming solvent onto said first image recording material;

a heating drum having an endless resilient belt wound therearound, said endless resilient belt being adapted for superimposing said first image recording material and a second image recording material and for winding said first and second image recording materials around said heating drum, said heating drum being adapted for heating said first and second image recording materials so as to heat develop and transfer an image of said first image recording material to said second image recording material; and a pair of peeling-off blades disposed opposite to said heating drum and engaged with said first and second image recording materials, said peeling-off blades being adapted for peeling off said first and second image recording materials from said heating drum.

12. An image recording apparatus according to claim 11, wherein a first reel is mounted to an axial end of said first conveying roller pair, wherein a second reel is mounted to an axial end of said second conveying roller pair, and wherein a belt is put around said first and second reels so as to transmit a drive force therebetween.

13. An image recording apparatus according to claim 11, wherein said peeling-off blades are disposed in succession on the outer periphery of said heating drum and adapted for successively peeling off said first and second image recording materials from said heating drum.

14. An image recording apparatus, comprising:

an exposure portion for exposing an image on a first image recording material so as to form an image thereon;

a first conveying roller pair disposed on an upstream side of said exposure portion and adapted for nipping and conveying said first image recording material;

a second conveying roller pair disposed on a downstream side of said exposure portion and adapted for nipping and conveying said first image recording material and for tensioning said first image recording material along with said first conveying roller pair, the peripheral speed of said second conveying roller pair being higher than the peripheral speed of said first conveying roller pair;

a pressuring piece disposed between said first and second conveying roller pairs, said pressuring piece extending along the lateral direction of said first image recording material and being in contact with a non-exposure surface thereof;

an image-forming-solvent applying portion for conveying and applying an image forming solvent onto said first image recording material;

a heating drum having an endless resilient belt wound therearound, said endless resilient belt being adapted for superimposing said first image recording material and a second image recording material and for winding said first and second image recording materials around said heating drum, said heating drum being adapted for heating said first and second image recording materials so as to heat develop and transfer an image of said first image recording material to said second image recording material; and a pair of peeling-off blades disposed opposite to said heating drum and engaged with said first and second image recording materials, said peeling-off blades being adapted for peeling off said first and second image recording materials from said heating drum, wherein said first and second conveying roller pairs each have a drive roller and a follower roller, the drive roller being rotated, the follower roller being in contact with the drive roller, and wherein the outer diameter of the drive roller of said first conveying roller pair is smaller than the outer diameter of the drive roller of said second conveying roller pair, so as to create tension in said first image recording material due to the difference of peripheral speeds of said first and second conveying roller pairs.

15. An image exposing apparatus, comprising:

an exposure portion for exposing an image on an image recording material so as to form an image thereon;

a first conveying roller pair disposed on an upstream side of said exposure portion and adapted for nipping and conveying said image recording material;

a second conveying roller pair disposed on a downstream side of said exposure portion and adapted for nipping and conveying said image recording material;

a pressuring piece disposed between said first and second conveying roller pairs, said pressuring piece extending along the lateral direction of said image recording material and having a distal edge in line contact with a non-exposure surface of said first image recording material along a line which intersects a conveying direction of said first image recording material, said distal edge being positioned so as to extend over a conveying path of said image recording material formed by said first and second conveying roller pairs and so as to press said image recording material in a direction in which an exposure surface of said image recording material is oriented.

* * * * *